United States Patent [19]

Lord et al.

[11] Patent Number: 4,676,541
[45] Date of Patent: Jun. 30, 1987

[54] ROBOT HAND

[75] Inventors: Duncan Lord, Keighley; John H. Bracewell, Blackburn, both of England

[73] Assignee: Cleveland-Guest (Engineering) Limited, Lancashire, England

[21] Appl. No.: 808,371

[22] Filed: Dec. 13, 1985

Related U.S. Application Data

[63] Continuation of Ser. No. 555,007, Nov. 25, 1983, abandoned.

[30] Foreign Application Priority Data

Nov. 27, 1982 [GB] United Kingdom ............... 8233880

[51] Int. Cl.$^4$ ........................... B66C 1/54; B66C 1/10
[52] U.S. Cl. ........................................ 294/88; 294/90
[58] Field of Search ............ 294/88, 110, 87.1, 87.22, 294/93, 94, 95, 96, 97, 16, 90, 89; 414/416, 753

[56] References Cited

U.S. PATENT DOCUMENTS

| | | | |
|---|---|---|---|
| 3,690,715 | 9/1972 | Vanlingen et al. | 294/88 |
| 4,340,249 | 7/1982 | Bucklew | 294/88 |

FOREIGN PATENT DOCUMENTS

| | | |
|---|---|---|
| 0092967 | 11/1983 | European Pat. Off. . |
| 1315865 | 5/1973 | United Kingdom . |
| 2068332 | 8/1981 | United Kingdom . |
| 2087349 | 5/1982 | United Kingdom . |
| 2118522 | 11/1983 | United Kingdom . |
| 2120634 | 12/1983 | United Kingdom . |
| 2140771 | 12/1984 | United Kingdom . |
| 2143800 | 2/1985 | United Kingdom . |

Primary Examiner—James B. Marbert
Attorney, Agent, or Firm—Roylance, Abrams, Berdo & Goodman

[57] ABSTRACT

A mechanical hand for a robot comprises a pair of change plates each having a slot therein to receive a prong of a finger or gripper. The change plates are slidable laterally of the hand to align the slots with the prongs which may be retained in correct spaced disposition in a pallet. Locking pins are located in aligned bores in plates and have a smaller diameter part which traverses a slot in a respective prong so that when the change plates are moved laterally the larger diameter part of the pins is engaged in apertures in the prongs but will not traverse the slots and thereby the fingers or grippers are retained in the hand. The change plates are movable by means of a piston/cylinder device which may be double acting or single acting with spring return provided.

5 Claims, 7 Drawing Figures

ROBOT HAND

This is a continuation of application Ser. No. 555,007 filed Nov. 25, 1983, now abandoned.

This invention relates to mechanical hands for robots, and in particular to such hands having interchangeable fingers or grippers.

Use of robots in manufacturing industries is increasing. In some cases a robot may be developed to perform one or a series of tasks without any changes in the constituent parts of the robot. However, in many cases, in order that the robot can perform all of the tasks required of it, it is necessary to change the fingers or grippers of the hand or hands of the robot at one or more stages of the operation being undertaken. The changing of the fingers or grippers in known robots entails the manual unscrewing or releasing of a finger retaining device or devices, changing the fingers and screwing or securing of the finger retaining device or devices. This finger changing operation is time consuming and, being a manual operation, to a certain degree defeats the object of using a robot for the main operation being undertaken. It is an object of the present invention to provide a mechanical hand for a robot which does not have the aforementioned disadvantage.

The invention provides a mechanical hand for a robot, comprising retaining means adapted to releasably retain at least one finger or gripper in said hand, said retaining means being movable between retain and release positions, and actuating means operable to move said retaining means between said positions.

The actuating means may be pneumatic actuating means. Alternatively the actuating means may be hydraulic or electrical actuating means.

The retaining means may comprise one or a plurality of change plates, the or each change plate having a slot therein adapted to receive a finger or gripper therein. The or each change plate may have a bore extending therethrough in which a locking pin is disposed so as to be slidable axially thereof. The or each locking pin may have a portion of smaller diameter than the remainder thereof, and said smaller diameter portion may be disposed substantially centrally of said pin.

The or each finger may be provided with a prong adapted to be received in said slot in a change plate. The or each such prong may have an aperture therein through which the larger diameter of a pin may pass. A slot may extend from an edge of said prong to said aperture, said slot being of a width less than the larger diameter of a pin and greater than the smaller diameter of a pin.

The invention also provides a mechanical hand for a robot as specified above and adapted to receive a plurality of fingers in relative spaced disposition and a pallet adapted to receive said fingers whereby said fingers extend from said pallet and are substantially mutually parallel and substantially in said relative spaced disposition.

The pallet may also comprise means adapted to restrain movement of each locking pin whilst said change plates are moved between said retain and release positions.

Embodiments of mechanical hand in accordance with the invention will now be described with reference to the accompanying drawings in which.

Figure 1:
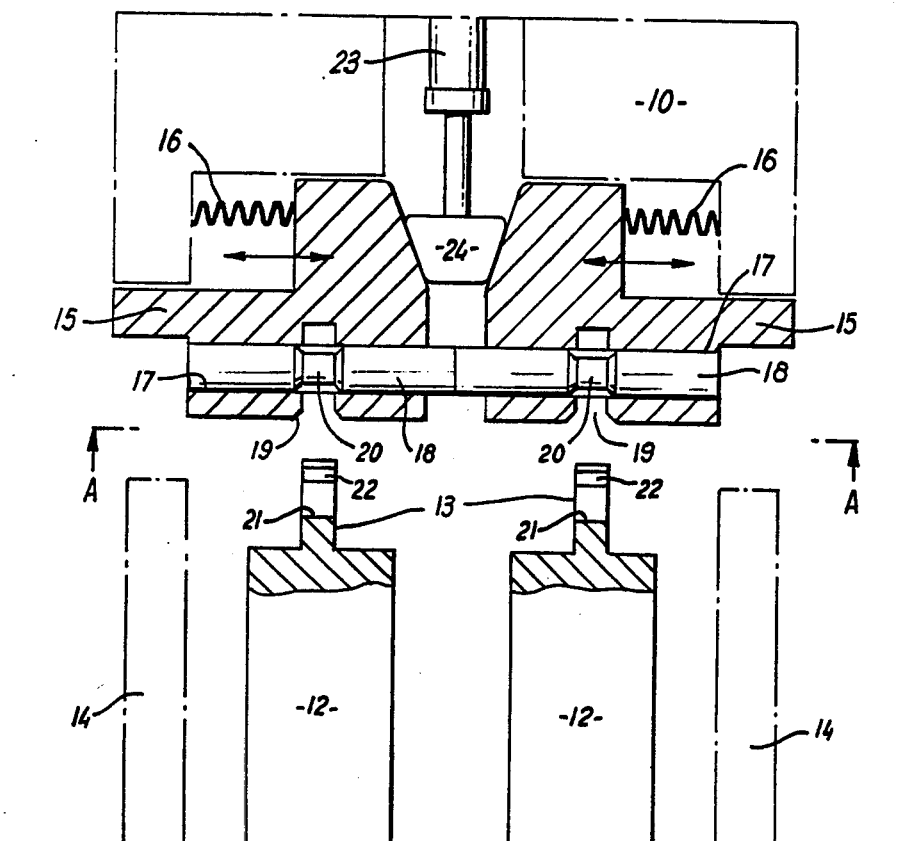
FIG. 1 is a part-sectional elevation of one embodiment with the fingers or grippers in a pallet.
Figure 2:
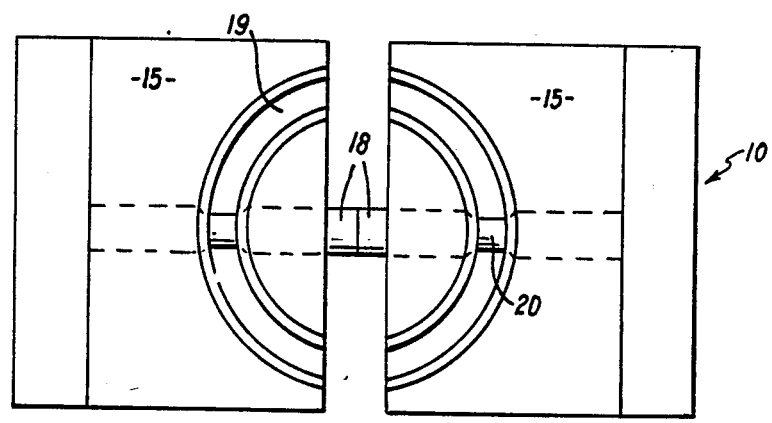
FIG. 2 is a view on A—A of FIG. 1.

Referring now to FIGS. 1 and 2 there is shown a mechanical hand 10, a pallet 11 and two fingers or grippers 12. The fingers or grippers 12 are retained in the pallet 11 so as to extend upwardly therefrom in spaced, parallel disposition, and at the uppermost part of each finger or gripper 12 is a prong 13. Also upstanding from the pallet 11, aligned with and to the outside of the fingers or grippers 12, are two restraining posts 14, the purpose of which is described hereinafter.

The hand 10 comprises a pair of change plates 15 which are slidable laterally as shown by the arrows in FIG. 1. Springs 16 bias the plates 15 towards each other. A bore 17 extends through each plate 15 and aligned locking pins 18 are slidable in the bores 17. A slot 19 is provided in each plate 15 and is adapted to receive the prong 13 of a finger or gripper 12. The pins 18 each have a centrally disposed part 20 which is of smaller diameter than the remainder of the pin 18, the length of this smaller part being substantially equal to the width of slot 19 and the thickness of prong 13. Provided in each prong 13 is an aperture 21 of diameter such that the larger diameter part of a pin 18 will pass through aperture 21. A slot 22 extends between the free end of each prong 13 and the aperture 21, the width of the slot 22 being greater than the smaller diameter 20 but smaller than the larger diameter of pins 18.

The operation of inserting the fingers or grippers 12 into the hand 10 is as follows.

Figure 3:
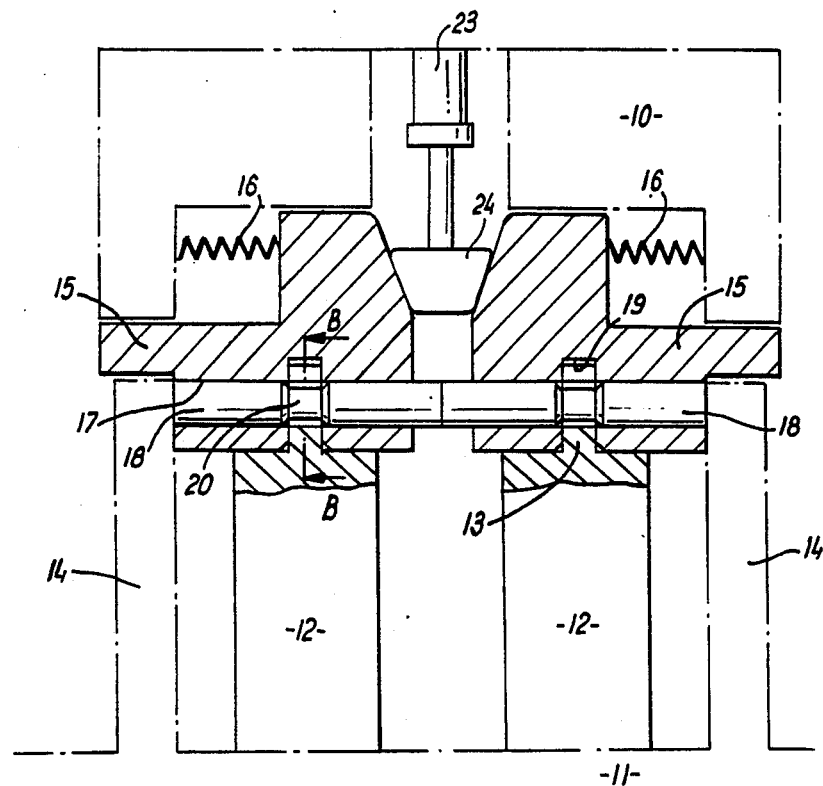
FIG. 3 is a view similar to FIG. 1 but with the fingers or grippers located in both pallet and mechanical hand.
Figure 4:
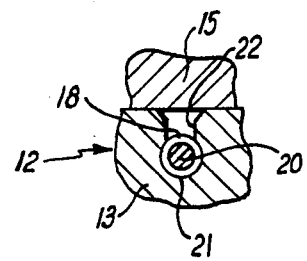
FIG. 4 is a scrap section on B—B of FIG. 3.

A pneumatic cylinder 23 is pressurised so that a cam 24 moves plates 15 away from each other against the force of springs 16 to the release position shown in FIG. 1. In this position the smaller diameter parts 20 of pins 18 are located within the slots 19 in plates 15. The hand 10 is positioned above the pallet 11 with the slots 19 aligned with the upstanding fingers or grippers 12 and the hand 10 is then lowered. The prongs 13 enter the slots 19 and the smaller diameter parts 20 of pins 18 pass along the slots 22 and into the apertures 21. The apparatus is then in the configuration shown in FIGS. 3 and 4. The pins 18 are located in this position by means of the restraining posts 14 whose spacing is equal to the combined length of the two pins 18.

Figure 5:
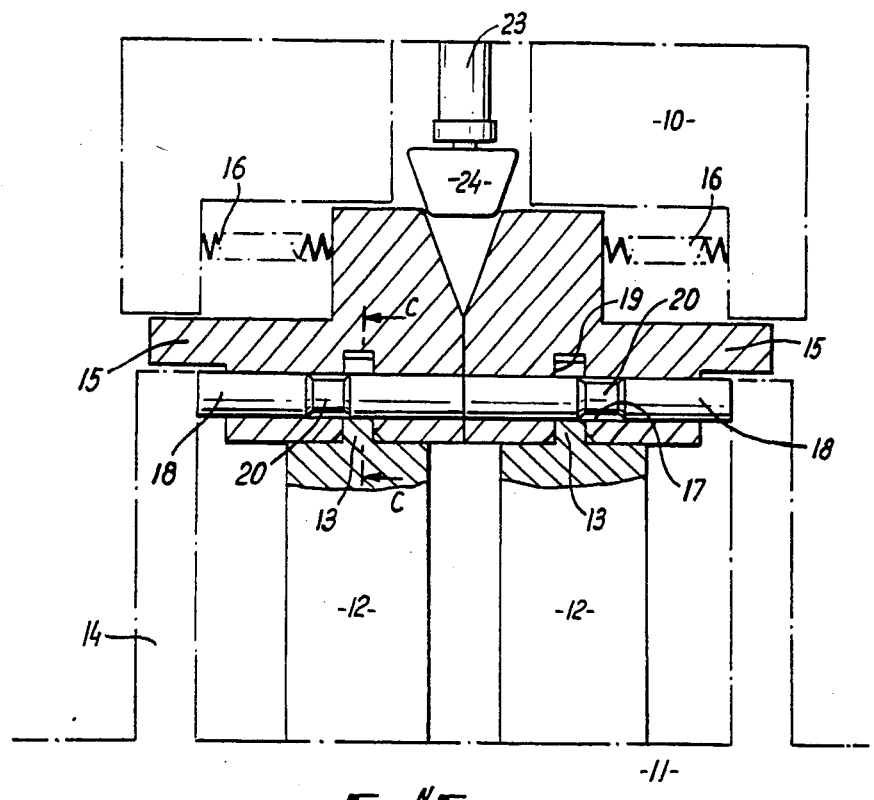
FIG. 5 is a view similar to FIG. 1 but with the fingers or grippers retained in the mechanical hand.
Figure 6:
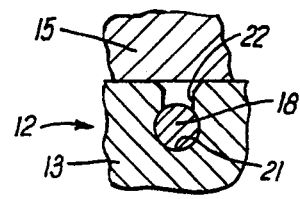
FIG. 6 is a scrap section on C—C of FIG. 5.

The cylinder 23 is then depressurised, thus retracting the cam 24. The springs 16 then cause the plates 15 to move inwardly until they meet in the retain position shown in FIGS. 5 and 6.

Movement of plates 15 causes inward movement of fingers or grippers 12, since prongs 13 are retained in slots 19. Since pins 18 are prevented from moving by posts 14 whilst plates 15 and prongs 13 are moved to this retain position, the apertures 21 of prongs 13 will move onto the larger diameter parts of pins 18. By this means removal of the prongs 13 from slots 19 is prevented since the width of slots 22 is less than the larger diameter of pins 18. The hand 10 is then raised relative to the pallet 11 with the fingers or grippers 12 securely held in position in the hand 10.

To change the fingers or grippers 12 for others is therefore a quick and simple operation with the hand of the invention. Operation of pneumatic cylinder 23 causes plates 15 to move outwardly and release the fingers or grippers 12 into an empty pallet 11. The hand 10 is then moved to a pallet 11 containing the new fingers or grippers 12 which are picked up in the manner described above. This operation can be programmed into a hand control device at the necessary stages of a manufacturing process so that repeated changes can be made fully automatically.

Figure 7:
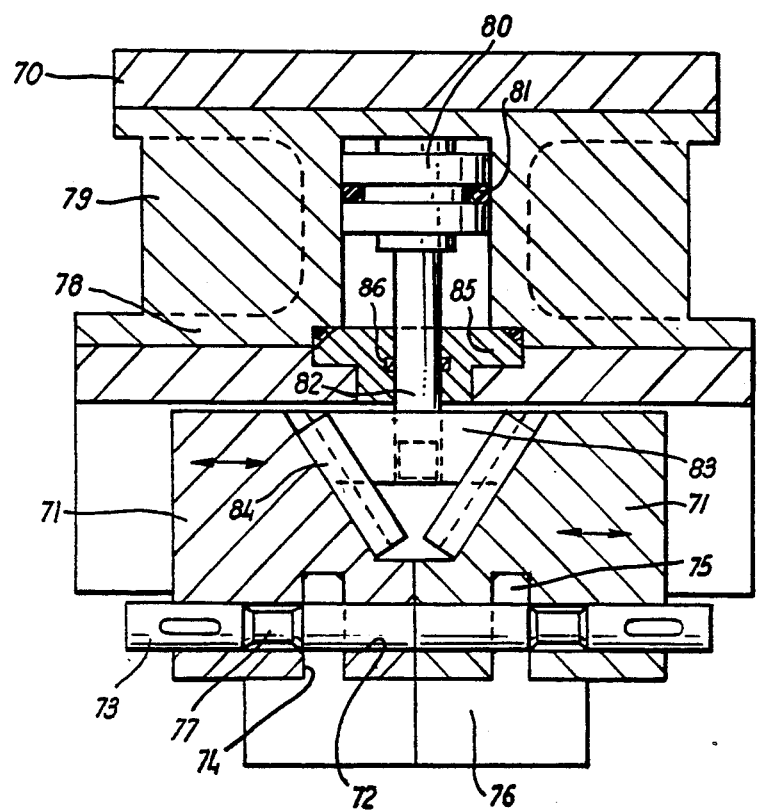
FIG. 7 is a sectional elevation of a second embodiment without the fingers or grippers.

Referring now to FIG. 7 there is shown a mechanical hand 70 having a pair of change plates 71 which are slidable laterally as shown by the arrows. A bore 72 extends through each plate 71 and aligned locking pins 73 are slidable in bores 72. A slot 74 is provided in each plate 71 and is adapted to receive a prong 75 of a gripper 76 or finger. The pins 73 each have a centrally disposed part 77 which is of smaller diameter than the remainder of the pin 73, the length of this smaller part being substantially equal to the width of slot 74. Provided in each prong 75 is an aperture and slot (not shown) of similar construction and dimensions in relation to pins 73 as those of prongs 13 of the previously-described embodiment, and operation of the plates 71, pins 73 and prongs 75 are as described in relation to the corresponding parts of the previous embodiment. In this embodiment however the single acting pneumatic cylinder 23, cam 24 and springs 16 previously described are replaced by a double acting pneumatic device 78. The device 78 comprises a cylinder 79 in which a piston 80 is slidable under pneumatic pressure. The piston 80 has an O-ring 81 mounted therearound to provide effective sealing within the cylinder 79. A piston rod 82 is attached to the piston 80 and has an actuating member 83 attached to the other end thereof. The actuating member 83 is received and retained in slides 84 secured to the change plates 71 so that movement of the piston 80, piston rod 82 and actuating member 83 in a direction towards or away from the grippers 76 causes movement of the change plates 71 in a direction laterally thereof. A bush 85 secured in the end of cylinder 79 and through which the piston rod 82 passes also has an O-ring 86 mounted therein to provide effective sealing onto the piston rod 82.

We claim:

1. A mechanical hand comprising:
   retaining means adapted to releasably retain at least one finger in said hand, said retaining means being movable between retain and release positions,
   actuating means operable to move said retaining means between said positions,
   said retaining means comprising at least one change plate,
   said at least one change plate having a slot therein adapted to receive a finger therein,
   said at least one change plate having a bore extending therethrough, and
   a locking pin disposed in said bore so as to be slidable axially thereof,
   said locking pin having a portion of smaller diameter than the remainder thereof.

2. A mechanical hand according to claim 1, wherein said smaller diameter portion is disposed substantially centrally of said locking pin.

3. A mechanical hand according to claim 2, said finger having a prong adapted to be received in said slot in a change plate.

4. A mechanical hand according to claim 3, wherein said prong has an aperture therein through which a locking pin may pass.

5. A mechanical hand according to claim 4, wherein said prong has an edge and a slot extending from said edge to said aperture, said slot being of a width greater than said smaller diameter portion of a locking pin but less than that of said remainder thereof.

* * * * *